Sept. 26, 1961  A. BOUWERS ET AL  3,001,446
OPTICAL SYSTEMS COMPRISING A SPHERICAL CONCAVE
MIRROR AND A MENISCUS LENS
Filed Jan. 6, 1959
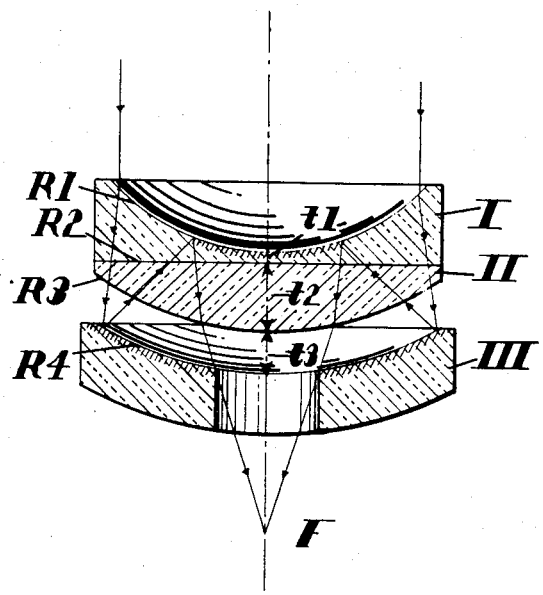
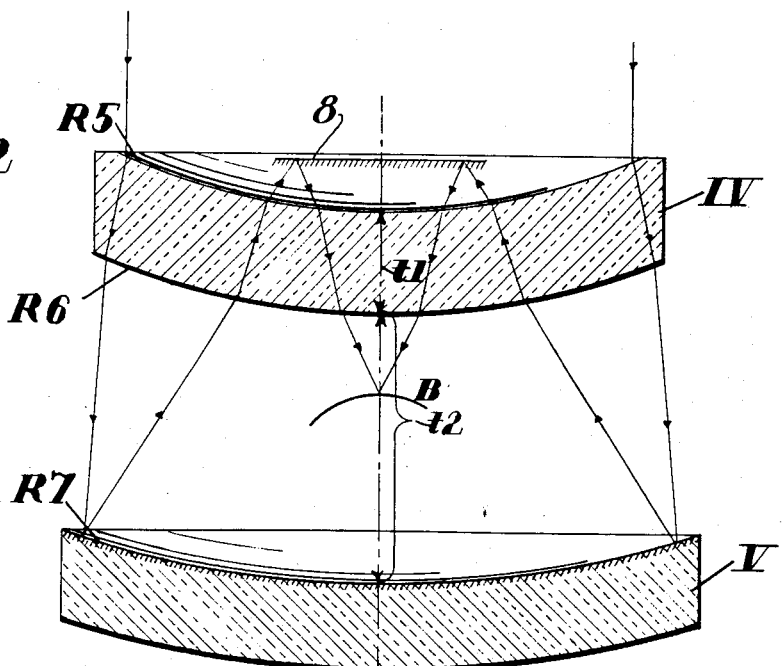
INVENTOR.
Albert Bouwers and
Johannes Becker
BY
Wenderoth, Lind & Ponack
ATTORNEYS

United States Patent Office 3,001,446
Patented Sept. 26, 1961

3,001,446
OPTICAL SYSTEMS COMPRISING A SPHERICAL CONCAVE MIRROR AND A MENISCUS LENS
Albert Bouwers, The Hague, and Johannes Becker, Delft, Netherlands, assignors to N.V. Optische Industrie de Oude Delft, Delft, Netherlands
Filed Jan. 6, 1959, Ser. No. 785,294
Claims priority, application Netherlands Oct. 15, 1951
6 Claims. (Cl. 88—57)

This application is a continuation-in-part of our application Serial No. 314,194 filed October 10, 1952, now abandoned, entitled "Optical Systems Comprising a Spherical Concave Mirror and a Meniscus Lens."

It is known to correct a spherical concave mirror by means of a negative meniscus lens which is concave on the side which is adjacent the centre of curvature of the mirror. See, for example, Patent No. 2,492,461 granted to the applicant.

It is also known from A. Bouwers, "Achievements in Optics," to utilize a spherical secondary mirror (vide FIG. 22 on page 54), which is located between the meniscus lens and the spherical concave mirror.

The latter system has the disadvantage that the length of the instrument is still too great for various applications.

According to the invention, the said disadvantages may be obviated by providing the secondary mirror either on the concave surface of the meniscus lens or at a distance therefrom which is less than $0.15\ f$, $f$ being the equivalent focal length of the system, the arrangement being such that said meniscus lens is traversed thrice by the light rays. Thus by simple means a system is obtained, which is extremely short, while the advantages of the conventional mirror systems, viz. great luminosity and excellent correction, are retained.

If the spherical mirror is manufactured by silvering the central portion of the concave surface of the meniscus lens, there is the further advantage that the said mirror may be covered with a protective layer.

The secondary mirror may alternatively be made plane, which affords advantages more particularly in those cases in which the image is to be produced in the interior of the optical system.

A further embodiment of the optical system according to the invention has the characteristic that the two external surfaces of the meniscus lens, together with the concave reflecting surface are concentric. It is thus ensured that the system is free from coma, astigmatism and lateral color.

In order that the invention may be readily carried into effect, it will now be described in greater detail with reference to the accompanying drawing showing, by way of example, two embodiments of the optical system according thereto.

FIGURE 1 is a schematic cross-sectional view of one embodiment of the invention.

FIGURE 2 is a schematic cross-sectional view of another embodiment of the invention.

The system shown in FIGURE 1 comprises the parts I and II of the meniscus lens, together with a concave mirror III. The radii of curvature, the thicknesses or separations and the data of the glasses are shown in the table below.

| radius of curvature in mm. | part | thickness or separation in mm. | $n_D$ | $\nu$ |
|---|---|---|---|---|
| R1=43.3 | I | t1=6 | 1.517 | 64.0 |
| R2=∞ | | | | |
| R3=59.3 | II | t2=10 | 1.517 | 59.7 |
| R4=67.1 | III | t3=7.8 | | |

Herein is:

$$\nu = \frac{n_D - 1}{n_F - n_C}$$

The surface R1 is centrally silvered and covered by a protective layer of lacquer, so that this central silvered portion forms a convex secondary mirror.

Part III comprises a central aperture, the reflecting surface R4 constituting a concave mirror.

The focus F is located at a distance of 33 mm. from the vertex of the concave reflecting surface R4.

The focal length is 100 mm. and the relative aperture is 1:2.

The system is corrected for an infinitely large distance of the object.

The whole system is apochromatic owing to the use of an achromatised meniscus lens. The system is furthermore concentric, so that it is free from coma, astigmatism and lateral colour.

FIGURE 2 shows a second embodiment in which use is made of a plane secondary mirror and the image is produced in the interior of the optical system.

The constructional data follow from the table below.

| radius of curvature in mm. | part | thickness or separation in mm. | $n_D$ | $\nu$ |
|---|---|---|---|---|
| R5=130.5 | IV | t1=19.5 | 1.517 | 64.0 |
| R6=150 | | | | |
| R7=203 | V | t2=53 | | |

A plane mirror 8 is arranged at a distance of 9.7 mm. in front of the concave surface R5 of the meniscus lens.

The image B is located at a distance of 37 mm. from the vertex of the concave reflecting surface R7.

The focal length is 100 mm. and the relative aperture is 1:1.

It is thought that the invention and its advantages will be understood from the foregoing description and it is apparent that various changes may be made in the form, construction and arrangement of the parts without departing from the spirit and scope of the invention or sacrificing its material advantages, the forms hereinbefore described and illustrated in the drawings being merely preferred embodiments thereof.

We claim:
1. An optical system comprising in optical alignment a spherical concave reflecting mirror axially air spaced from a meniscus corrector lens positioned between the said concave reflecting mirror and its center of curvature with the refracting surfaces of said meniscus corrector lens substantially concentric with said concave reflecting mirror and a secondary reflecting mirror axially positioned between the concave surface of said meniscus corrector lens and the center of curvature of said concave mirror whereby the imaging light rays from the object to the image plane are refracted three times by the said meniscus corrector lens in said optical system.

2. An optical system comprising in optical alignment a spherical concave reflecting mirror axially air spaced from a meniscus corrector lens positioned between the said concave reflecting mirror and its center of curvature with the refracting surfaces of said meniscus corrector lens substantially concentric with said concave reflecting mirror and a secondary reflecting mirror axially positioned between the concave surface of said meniscus corrector lens and a point at a distance from said concave surface which is less than $0.15 f$, $f$ being the equivalent focal length of the system whereby the imaging light rays from the object to the image plane are refracted a plurality of times by the said meniscus corrector lens in said optical system.

3. An optical system comprising in optical alignment a spherical concave front-surface reflecting mirror in air, a meniscus corrector lens in air, said meniscus lens being positioned between said concave reflecting mirror and its center of curvature and having concave and convex spherical outer surfaces both curved in the same sense as said concave mirror, said meniscus lens having negative dioptric power so as to substantially correct for the spherical aberration of the system, and a secondary reflecting mirror axially positioned between said concave outer surface of said meniscus lens and the center of curvature of said concave mirror whereby imaging light rays travelling from an object to the image surface of the system are refracted three times by each of said refractive surfaces of said meniscus corrector lens.

4. An optical system as claimed in claim 3 wherein said secondary reflecting mirror is axially positioned between said concave outer surface of said meniscus corrector lens and a point at a distance from said concave surface which is less than $0.15 f$, $f$ being the equivalent focal length of the system.

5. An optical system comprising in optical alignment, a spherical concave front surface reflecting mirror in air, a meniscus corrector lens positioned between said concave reflecting mirror and its center of curvature and having spherical concave and convex outer surfaces curved in the same sense as said spherical reflecting mirror, said meniscus lens having negative dioptric power so as to substantially correct for the spherical aberration of the system, and a convex secondary reflecting mirror axially positioned on said concave outer surface of said meniscus lens and having the radius of curvature of said concave outer surface so as to internally reflect light rays reflected from said concave mirror, whereby such light rays travelling from an object to the image surface of the system are refracted once by said concave outer surface and are refracted three times by said convex outer surface.

6. An optical system comprising in optical alignment a spherical concave reflecting mirror axially air spaced from a meniscus corrector lens positioned between the said concave reflecting mirror and its center of curvature with the refracting surfaces of said meniscus corrector lens substantially concentric with said concave reflecting mirror and a convex secondary reflecting mirror axially positioned on the concave surface of said meniscus corrector lens whereby the imaging light rays from the object to the image plane are refracted four times by the said meniscus corrector lens in said optical system.

References Cited in the file of this patent

UNITED STATES PATENTS

| | | |
|---|---|---|
| 1,967,214 | Acht | July 24, 1934 |
| 2,378,301 | Kaprelian | June 12, 1945 |
| 2,448,699 | Bouwers | Sept. 7, 1948 |
| 2,492,461 | Bouwers | Dec. 27, 1949 |
| 2,504,383 | Bouwers et al. | Apr. 18, 1950 |
| 2,563,433 | Taylor | Aug. 7, 1951 |
| 2,608,129 | Taylor | Aug. 26, 1952 |
| 2,610,547 | Back | Sept. 16, 1952 |
| 2,793,564 | Bouwers et al. | May 28, 1957 |

OTHER REFERENCES

"New Catadioptric Meniscus Systems," Maksutov, published in Journal Optical Society of America, vol. 34, No. 5, May 1944, pages 270–284.

"Achievements in Optics," A Bouwers-Book, published 1946, by Elsevier Publishing Co., Inc., New York, N.Y.